United States Patent [19]

Corfield

[11] 4,114,001
[45] Sep. 12, 1978

[54] ELECTRICAL SWITCH HAVING INTERLOCK BETWEEN DOOR AND SWITCH

[75] Inventor: John Courtney Corfield, Waltham St. Lawrence, England

[73] Assignee: Unimax Switch Limited, Maidenhead, England

[21] Appl. No.: 727,849

[22] Filed: Sep. 29, 1976

[30] Foreign Application Priority Data

Oct. 1, 1975 [GB] United Kingdom ............... 40111/75

[51] Int. Cl.² ............................................. H01H 9/00
[52] U.S. Cl. ................................. 200/50 A; 200/42 R; 200/336; 70/DIG. 57
[58] Field of Search ...................... 200/42 R, 44, 50 A, 200/330, 336; 70/DIG. 57

[56] References Cited

U.S. PATENT DOCUMENTS

| 1,142,732 | 6/1915 | Schoell | 200/42 R |
| 1,337,137 | 4/1920 | Kaplan | 70/DIG. 57 |
| 1,595,853 | 8/1926 | Canfield | 200/336 X |

FOREIGN PATENT DOCUMENTS 1,260,322 1/1972 United Kingdom.

Primary Examiner—James R. Scott
Attorney, Agent, or Firm—Bernard Malina

[57] ABSTRACT

A method and device for rendering safe the opening or removal of a machine door which is normally kept locked to guard machinery or an area which is potentially hazardous. The device includes a lock unit having a lock body for connection to the frame panel of machinery to be guarded and supports an electrical switch. A key unit includes a key body which supports a rotatable control knob and a key adapted to cooperate with the lock body when the door is closed on the frame panel. The key body includes a radially extending peripheral flange formed with a hole towards its outer edge which rotatably receives the head of a screw. The threaded end of the screw cooperates with a threaded hole in the frame panel when the door is closed and must be screwed fully into the hole to fully close the door onto the panel. The control knob which can be depressed and rotated to OFF and ON positions includes a mask in the form of an arcuate flange which renders the head of the screw accessible for operation only when the control knob assumes a particular angular OPEN position. The screw must be screwed into the threaded hole in the frame unit and the control knob depressed and rotated to the ON position before power is supplied to the machinery. Unlocking cannot be effected until the control knob is turned to the OFF position and further turned to the OPEN position to unmask the screw head whereupon the screw can be unscrewed from the frame panel to allow the door to be opened. The delay produced by the time taken to unscrew the screw allows rotating machinery to come to rest before the door can be opened.

27 Claims, 7 Drawing Figures

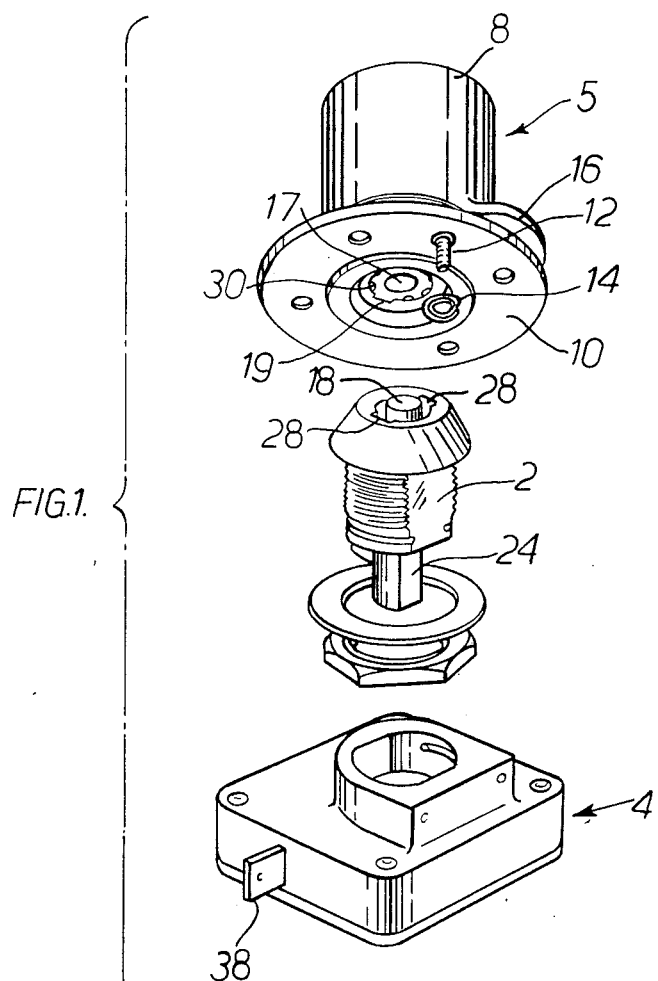
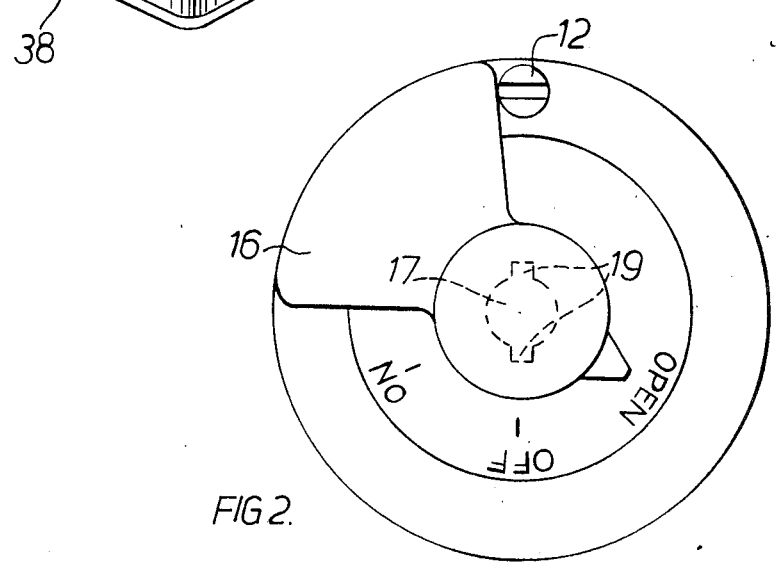

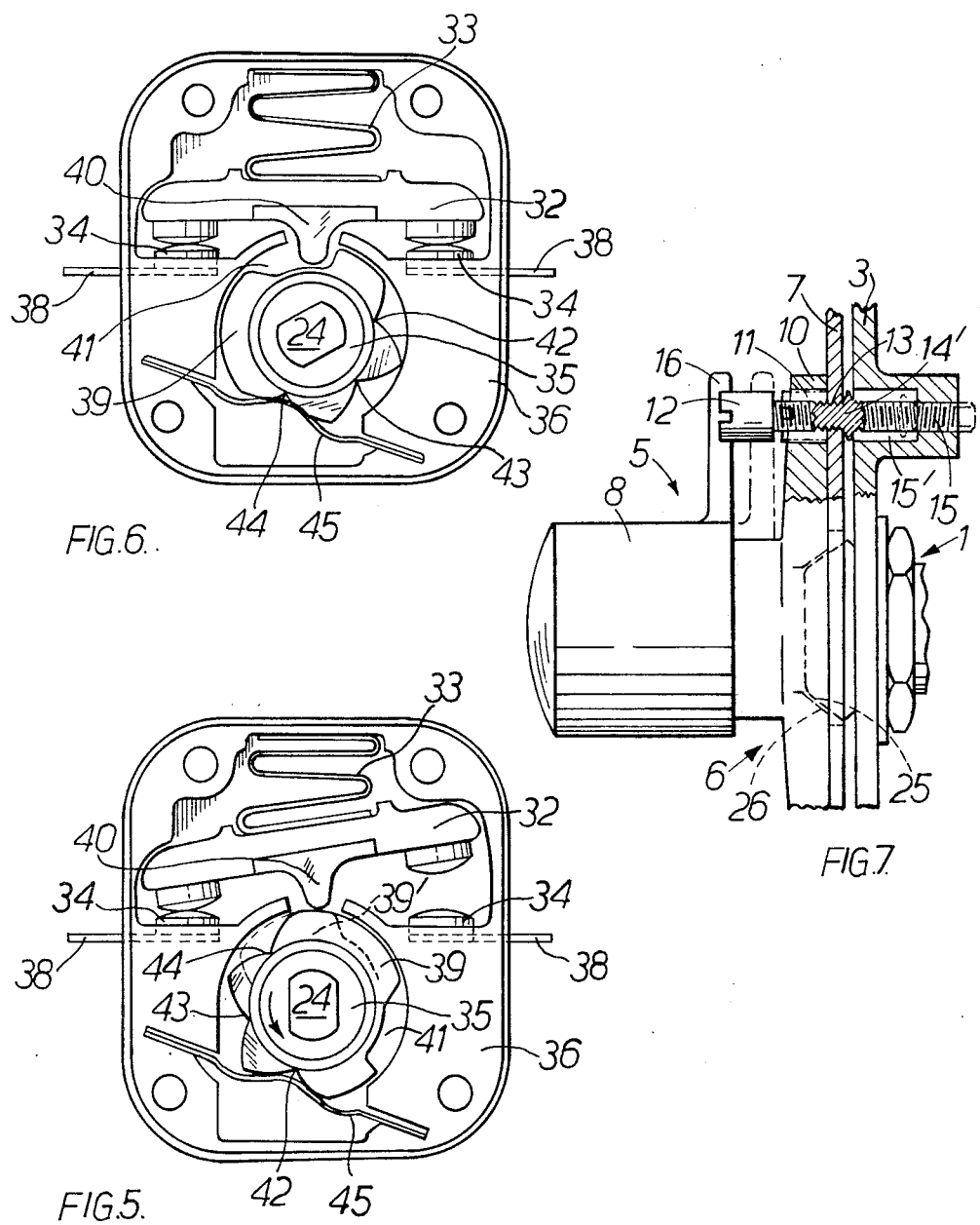

ELECTRICAL SWITCH HAVING INTERLOCK BETWEEN DOOR AND SWITCH

BACKGROUND OF THE INVENTON

This invention relates to a method and means for rendering safe the opening or removal of a machine door, cover or guard which is normally kept locked to guard machinery or an area which is potentially hazardous.

British Pat. No. 1,260,322 discloses a safety device comprising a lock unit for connection to a fixed structure of machinery, and a captive key unit for connection to a door, cover or guard of the machinery, the two units being adapted so that they can be engaged and locked together by rotation of the captive key unit when the door is closed. The lock unit also incorporates electrical switching means which is controlled by rotation of the captive key unit and which in turn controls the power supply to the machinery so that power is connected only when the two units are locked together and is disconnected when the captive key unit is turned to an open position in which the two units can be freely disengaged and engaged to open and close the door.

This known safety device is adequate for machinery which is rendered safe as soon as the power supply is disconnected. However, it is not adequate for machinery which remains potentially dangerous for some time after power is disconnected, because the door can then be opened while the machinery is still in a dangerous state. For example, the machinery may have rotating parts which do not come to rest immediately power is disconnected, either because of the inertia of these parts or because they are stopped gradually, such as in a textile mill to prevent the breaking of fibres. An object of the present invention is to provide a safety device which overcomes this shortcoming of the known safety device.

SUMMARY OF THE INVENTION

The present invention consists in providing a first unit to be connected to a fixed structure of machinery and which includes electrical switching means for controlling power to the machinery; a second unit to be connected to a door, cover or guard and which includes a control knob movable between OPEN and ON positions and which is adapted to cooperate with said first unit when the door is closed so that movement of the control knob controls operation of said switching means and connects power to the machine only when in the ON position; a releasable fastening device to be mounted on said door so that it is captive thereon and cooperates with the fixed structure of the machine to lock said door closed; and masking means carried on said control knob and positioned in relation to said releasable fastening device so as to cooperate therewith and prevent operation of the releasable fastening device when the control knob is in any position other than the OPEN position; said releasable fastening device being such that it has to be operated to lock the door closed before the control knob can be operated to control said switching means.

Thus, in an arrangement according to the invention the releasable fastening device must be operated to lock the two units together before the control knob can be moved from the OPEN to the ON position to connect power to the machinery, and cannot thereafter be released while the control knob remains in the ON position. It is only after the control knob is again moved to the OPEN position in which power is disconnected from the machinery that the fastening device can be released, and then, the time taken to actually release the fastener means, which can be predetermined by a suitable choice of fastening device, is such as to introduce a sufficient delay for any dangerous conditions such as over-running of the machinery to have ceased before opening the door.

The releasable fastening device is preferably a screw which is captive in a hole in the second unit on the door and which screws into a hole in the first unit on the machinery structure. The screw may be such that it is fixed axially relative to the door and controls the final closing movement of the door as it is screwed into the hole in the first unit, thereby preventing the control knob of the first unit from being coupled to the second unit to operate the electrical switching means until the screw has been operated to close the door. Alternatively, the screw may be such that it moves axially relative to the door as it is operated, and thereby prevents the control knob from being moved from the OPEN position until the screw has been operated to lock the door.

BRIEF DESCRIPTION OF THE DRAWINGS

The invention will now be described by way of example with reference to the accompanying drawings in which:

FIG. 1 is an exploded perspective view of the major components of a safety device according to the invention, FIG. 2 is an end view of the control knob in FIG. 1, FIG. 5 is a side view of the switch in FIGS. 3 and 4 with the side cover removed, FIG. 6 is a side view of the switch similar to FIG. 5 but with the safety device in the ON position, and FIG. 7 is a side view of an alternative embodiment of the invention.

DETAILED DESCRIPTION OF THE INVENTION

Figure 3:
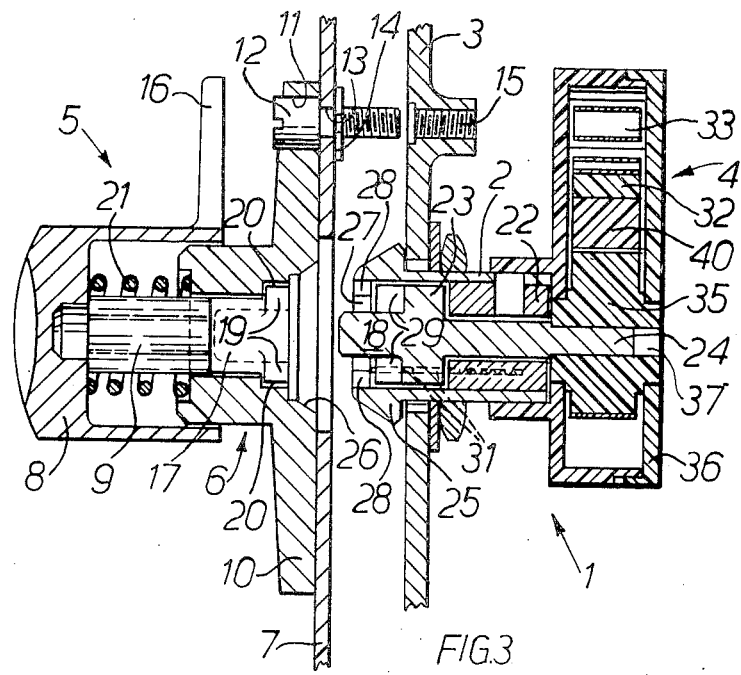
FIG. 3 is an axial section through the safety device of FIG. 1 when installed and in the OPEN position.

The drawings show a safety device comprising two separate units. One unit 1 comprises a lock body 2 and is adapted for connection to the frame panel 3 of machinery to be guarded and supports an electrical switch 4. The other unit 5 comprises a key body 6 which is adapted for connection to a door, cover or guard 7 provided on said machinery, and slidably and rotatably supports a control knob 8 and a key 9 which is adapted to cooperate with the lock body 2 as hereinafter described when the door 7 is closed.

Figure 4:
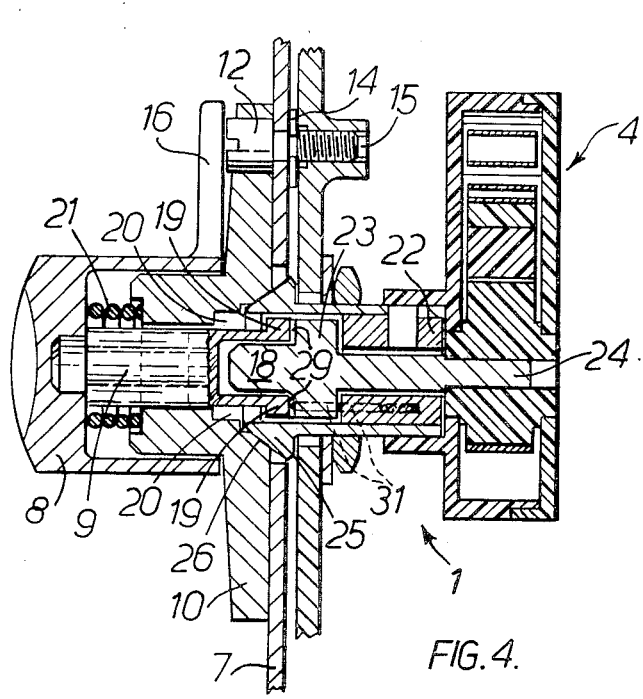
FIG. 4 is a view similar to that of FIG. 2 but with the safety device in the locked and OPEN position.

The key body 6 has a radially extending peripheral flange 10 around its base by which it is connected to the door 7. This flange 10 is formed with a hole 11 towards its outer edge and rotatably receives the head of a screw 12 which projects through a hole 13 in the door 7 and is held captive therein by a circlip 14. The threaded end of the screw 12 cooperates with a threaded hole 15 in the frame panel 3 when the door is closed, and has to be screwed fully into this hole 15, as shown in FIG. 4, in order to fully close the door. However, the head of the screw 12 is only accessible for operation by a screw driver when the control knob 8 assumes a particular angular position, shown marked as the OPEN position in FIG. 2, in which masking means in the form of an arcuate flange 16 carried on the control knob 8, exposes the head of the screw. The control knob can be depressed and rotated to OFF and ON positions as described hereinafter but in these positions the flange 16 covers the head of the screw 12.

The control knob 8 is a hollow cylindrical member which fits telescopically over the key body 6 and carries the arcuate flange 16 at its open end to project radially therefrom, and carries the key 9 within it so that it projects axially from the closed end of the control knob. The key 9 is a slidable and rotatable fit in a bore in the key body 6 and is hollowed out at its free end to form a key bit 17 with a cylindricl socket to engage a locating peg 18 in the lock body 2. Two laterally extending diametrically opposed key lugs 19 are formed at the extremity of the key bit 17 and these are received in a corresponding pair of guide recesses 20 in the key body 6 when the control knob 8 is in its OPEN position and released, as shown in FIG. 3, a coil spring 21 then acting between the head of the control knob and the key body to retract the key into the key body.

The lock body 2 houses a cylinder lock mechanism of the axial pin tumbler type comprising a barrel or pin tumbler holder 22 fixed in the body 2 and a cooperating rotatable barrel or pin tumbler holder 23 which is integral with a lock spindle 24 rotatable in the body 2.

The lock body 2 has a coned face bezel 25 to engage a corresponding coned seating 26 on the key body. In the front wall of the bezel a keyhole 27 is formed cmprising a central hole to receive the key bit 17 and a pair of diametrically opposed slots 28 to receive the key lugs 19 on the key bit. Further, the lock spindle 24 is formed with a pair of diametrically opposed notches 29 in its barrel 23 to receive the key lugs 19.

When the door 7 is closed and the screw 12 is screwed fully into hole 15 to lock the two units 1 and 5 together, as shown in FIG. 4, the seating 26 on the key body 6 engages the bezel 25 on the lock body 2. The key lugs 19 are then aligned with the slots 28 in the bezel 25 on the lock body and thus the control knob can be depressed against the action of spring 21 to insert the key bit 17 through the keyhole 27, the key bit being guided by the locating peg 18, and the key lugs 19 passing through the slots 28 in the bezel 25 and engaging the notches 29 in the barrel 23 on the lock spindle 24. Key bittings 30 are provided circumferentially bewteen the key lugs 19 in the end of the key bit 17 (see FIG. 1), and these cooperate with pin tumblers 31 of the cylinder lock mechanism in the lock body 2 (as shown in FIG. 3) to release the barrel 23 for rotation of the lock spindle by the key 9 acting through the key lugs 19 in the notches 29.

In turning the key 9 and lock spindle 24, the key lugs 19 move behind the portions of the front wall of the bezel 25 which lie between the keyhole slots 27 and which form abutment surfaces against which the key lugs engage to further lock the units 1 and 5 together.

As well as further locking the two units 1 and 5 together, turning of the control knob 8 from the OPEN position brings the arcuate flange 16 in front of the head of screw 12, thereby preventing it from being unscrewed again until the control knob is returned to the open position.

Turning of the control knob 8 also controls operation of the switch 4 which, as best seen in FIGS. 5 and 6, is of the type comprising a contact bridge 32 which is urged by spring means 33 to make bridging contact with a pair of stationary switch contacts 34 and is movable against the action of the spring means 33 by a rotary cam 35. The switch housing 36 is mounted on the lock body 2 and the end of spindle 24 engages a shaped hole 37 in the cam 35. The two switch contacts 34 are mounted on terminals 38 which are connected in a circuit controlling the supply of power to said guarded machinery.

When the safety device is in the condition shown in FIG. 4 with the control knob 8 in the OPEN position, the switch 4 assumes the position shown in FIG. 5 in which a raised cam surface 39 on cam 35 engages the cam follower 40 on bridge 32 and pivots the latter at one end on the respective pair of switch contacts to separate the switch contacts at the other end. Power is thereby disconnected from the machinery. Turning of the control knob 8 from the OPEN to the OFF position rotates the cam 35 counterclockwise as seen in FIG. 5, so that the raised cam surface 39 assumes the position 39' shown in broken lines. In this position, the bridge 32 is still held raised by the cam surface 39 and thus power is still disconnected from the machinery. However, further counterclockwise rotation of the control knob 8 to the ON position turns the cam 35 to the position shown in FIG. 6 in which the cam follower 40 has disengaged the cam and lies in a recess 41 in the latter. The spring means 33 now urges the bridge into engagement with both stationary switch contacts 34 and a circuit is completed through the switch to connect power to the machinery.

Stable OPEN, OFF and ON positions of the cam are defined by respective notches 42, 43 and 44 in the cam 35 which are engaged by a leaf spring 45. Leaf spring means may also be provided within the control knob 8 to act between the key body 6 and key 9 to define corresponding stable positions for the control knob.

The safety device therefore protects personnel against injury by preventing the connection of power to the machinery unless the door 7 is closed and locked by screwing screw 12 into hole 13 and depressing and rotatig the control knob 8 to the ON position. Further, personnel are protected against injury on subsequent unlocking and opening of the door 7 by delaying final opening so that the machinery will have attained a safe state. Thus, on unlocking the door, power is automatically disconnected once the control knob is turned to the OFF position, but unlocking cannot be effected until the control knob is further turned to the OPEN position in which the key lugs 19 are aligned with the slots 28 in bezel 25 ready for withdrawal of key 9 from the lock body 2, and the head of screw 12 is exposed. Screw 12 can then be unscrewed and the door finally opened. The time taken to unscrew screw 12 produces the required delay and can be varied simply by varying the length of the screw.

It will be appreciated that the provision of the coded bittings 30 on the key to operate the lock tumbler mechanism makes it impossible to connect power to the unguarded machinery by insertion of a simple object through the keyhole in the lock body.

The safety device of FIGS. 1 to 6 is basically the device disclosed in British Pat. No. 1,260,322 with modifications consisting of the addition of the screw 12 and corresponding hole 13, and the arcuate flange 16 on the control button 8.

An alternative embodiment of the invention is illustrated in FIG. 7, which like the embodiment of FIGS. 1 to 6 consists in a modification to the device of British Pat. No. 1,260,322. As in the preceding embodiment, the flange 10 of the key body 6 is formed with a hole 11 towards its outer edge and this receives a screw 12. However, the screw 12 is a threaded fit in the hole 13 in the door 7 so that the head of the screw 12 moves axially as it is screwed into and out of engagement with the threaded hole 15 in the frame panel 3. As shown in FIG. 7, the screw 12 is in its fully unscrewed or released position in which the tip of the screw just contacts the mouth of hole 15 when the door is fully closed against the frame panel 3, and the head of the screw lies in the path of angular movement of flange 16, even when the knob 8 is released in its OPEN position. Rotation of screw 12 to engage hole 15, then immediately locks the door closed, but the screw has to be screwed into hole 15 until the head of the screw engages in hole 11, as shown in broken lines in FIG. 7, before the knob 8 can be depressed and rotated from the OPEN to the OFF and ON positions. The screw 12 thus serves the additional function of locking the control knob 8 in its OPEN position once the screw is unscrewed to unlock the two units 1 and 5.

The screw 12 in FIG. 7 is held captive in the hole 13 by upsetting a part 14' of the shank of the screw, as by crimping for example. A corresponding larger diameter bore 15' leading to the threaded hole 15, is then formed in the frame panel 3 to accommodate axial movement of this upset part 14'. Alternatively, a circlip could be provided in place of the upset part 14', but then the bore 15' would need to be of correspondingly increased diameter to accommodate the larger diameter of the circlip.

In the same way that a circlip and an upset part are interchangeable in the embodiment of FIG. 7, it will be appreciated that the circlip 14 in the embodiment of FIGS. 1 to 6 could be replaced by an upset portion. In fact, any mechanically equivalent means could be provided in place of a circlip or an upset part to hold the screw captive in the holes 7 and 10 of either illustrated embodiment.

The hole 13 in door 7 of the embodiment of FIG. 7 is threaded to engage the screw 12, but it will be appreciated that alternatively hole 13 could be a plain hole and the hole 11 in flange 10 could be formed with a cooperating thread over part of its length or a separate nut could be fastened to the rear of door 7 to engage the screw 12.

The embodiment of FIG. 7 can be modified without affecting its operational characteristics by making hole 13 in door 7 a plain hole and providing spring means to urge the head of screw 12 axially away from the flange 10. The spring means could, for example, take the form of a coil spring surrounding the screw and acting between its head and the door 7.

In other alternative embodiments of the invention, instead of locating the screw 12 in a hole 11 in the flange 10 of the key body, the screw 12 could be located in a hole in the door 7 at a point radially removed from the flange 10, and the flange 16 could be correspondingly extended beyond the outer edge of flange 10 to cover the head of the screw in the same way as in the illustrated embodiments.

In yet other alternative embodiments of the invention, the screw 12 may be the only means provided to lock the two units 1 and 5 together.

I claim:

1. A method of rendering safe the opening or removal of a machine door, cover or guard comprising connecting to a fixed structure of said machine a first unit which includes electrical switching means for controlling power to said machine; connecting to said door a second unit which includes a control knob movable between OPEN and ON positions and which is adapted to cooperate with said first unit when the door is closed so that movement of the control knob controls operation of said switching means and connects power to the machine only when in the ON position; mounting a releasable fastening device on said door so that it is captive thereon, and mounting cooperating means on said fixed structure of the machine for engagement by said releasable fastening device to lock said door closed; providing masking means on said control knob which is positioned in relation to said releasable fastening device so as to cooperate therewith and prevent operation of the releasable fastening device when the control knob is in any position other than the OPEN position; and arranging that said releasable fastening device has to be operated to lock the door closed before the control knob can be operated to control said switching means.

2. A method as claimed in claim 1 in which said releasable fastening device is arranged so that operation thereof to lock the door serves to control the final closing movement of the door, whereby it prevents cooperation between said first and second units until it has been operated to close the door.

3. A method as claimed in claim 1 in which said releasable fastening device is arranged so as to prevent the door knob from being moved from the OPEN position until it has been operated to lock the door closed.

4. A method as claimed in claim 1 in which the releasable fastening device is a screw.

5. A method as claimed in claim 2 in which the releasable fastening device is a screw which is substantially fixed against axial movement relative to said door.

6. A method as claimed in claim 3 in which the releasable fastening device is a screw which is mounted so as to be movable axially relative to said door between a released position in which it obstructs movement of said control knob from the OPEN position and a loaded position which it assumes when locking the door closed and in which it does not obstruct movement of said control knob.

7. A safety device for rendering safe the opening or removal of a machine door, cover or guard comprising a first unit which is adapted for connection to a fixed structure of said machine and which includes electrical switching means for controllig power to said machine; a second unit which is adapted for connection to said door and which includes a control knob movable between OPEN and ON positions and which is adapted to cooperate with said first unit when the door is closed so that movement of the control know controls operation of said switching means and connects power to the machine only when in the ON position; a releasable fastening device which is adapted to be located in said second unit and connected to said door so that it is captive thereon and which is co-operable with the fixed structure of the machine to lock said door closed; and masking means which is mounted on said control knob and is positioned in relation to said releasable fastening device so as to cooperate therewith and prevent operation of the releasable fastening device when the control knob is in any position other than the OPEN position; said releasable fastening device being such that it has to be operated to lock the door closed before the control knob can be operated to control said switching means.

8. A device as claimed in claim 7 in which said releasable fastening device is such that operation thereof to lock the door serves to control the final closing movement of the door, whereby it prevents cooperation between said first and second units until it has been operated to close the door.

9. A device as claimed in claim 7 in which said releasable fastening device is such as to prevent the door knob from being moved from the OPEN position until it has been operated to lock the door closed.

10. A device as claimed in claim 7 in which the releasable fastening device is a screw which cooperates with a threaded hole carried on said fixed structure of the machine.

11. A device as claimed in claim 8 in which the releasable fastening device is a screw which is substantially fixed against axial movement relative to said door.

12. A device as claimed in claim 9 in which the releasable fastening device is a screw which is mounted so as to be movable axially relative to said door between a released position in which it obstructs movement of said control knob from the OPEN position and a locked position which it assumes when locking the door closed and in which it does not obstruct movement of said control knob.

13. A device as claimed in claim 12 in which the screw engages threaded means fixed relative to the door so that it moves axially as it is operated.

14. A device as claimed in claim 10 in which the screw is held captive on said second unit by a circlip mounted on the shank of the screw.

15. A device as claimed in claim 10 in which the screw is held captive on said second unit by a radially enlarged portion of the shank of the screw.

16. A device as claimed in claim 7 in which the control knob is rotatable on a body portion which is provided with a hole to receive said releasable fastening device, and in which said masking means comprises a radially projecting flange which covers the hole in all positions other than said OPEN position of the control knob.

17. A device as claimed in claim 16 in which the control knob carries keying means which cooperates with a rotatable member of said first unit when both units are locked together with the door closed, whereby rotation of the control knob is transferred to said rotatable member which in turn operates said switching means.

18. A device as claimed in claim 17 in which said switching means comprises a cam operated switch.

19. A device as claimed in claim 17 in which the keying means is rotatably and slidably mounted with the control knob in said second unit and comprises laterally extending lugs which are insertable through corresponding slots in the first unit when the control knob is in the OPEN position and which cooperate with abutment surfaces in the first unit to prevent withdrawal of the keying means when the latter is inserted into the first unit and the control knob is turned to the ON position.

20. A device as claimed in claim 19 in which the lugs on the keying means engage corresponding notches in said rotatable member, whereby the two are coupled to rotate together.

21. A device as claimed in claim 19 in which spring means is provided in the second unit to urge the keying means to a withdrawn position in which the lugs thereon are automatically aligned in a predetermined angular orientation.

22. A device as claimed in claim 19 in which the first unit comprises a cylinder lock mechanism including a lock spindle which constitutes said rotatable member and which is normally locked against rotation but is freed for rotation by insertion of the keying means into said slots in the first unit.

23. A device as claimed in claim 22 in which the cylinder lock mechanism is of the axial pin tumbler type and in which the keying means is provided with coded bittings for engagement with the pin tumblers of the lock mechanism to effect release of the lock spindle.

24. A device as claimed in claim 19 in which the control knob is rotatable between OPEN, OFF and ON positions, the lugs cooperating with said abutment surfaces in the first unit to prevent withdrawal of the keying means when the latter is inserted into the first unit and the control knob is in the OFF and ON positions.

25. In or for a machine in which the opening or removal of a machine door, cover or guard is rendered safe, a first unit which is connected to a fixed structure of said machine and which includes electrical switching means for controlling power to said machine; a second unit which is connected to said door and which includes a control knob movable between OPEN and ON positions and which is adapted to co-operate with said first unit when the door is closed so that movement of the control knob controls operation of said switching means and connects power to the machine only when in the ON position; a releasable fastening device which is mounted on said door so that it is captive thereon; cooperating means which is mounted on said fixed structure of the machine for engagement by said releasable fastening device to lock said door closed; masking means which is mounted on said control knob and is positioned in relation to said releasable fastening device so as to cooperate therewith and prevent operation of the releasable fastening device when the control knob is in any position other than the OPEN position; said releasable fastening device being such that it has to be operated to lock the door closed before the control knob can be operated to control said switching means.

26. A machine as claimed in claim 25 in which the said releasable fastening device is a screw which engages cooperating means in the form of a threaded hole fixed relative to said fixed structure of the machine and which when operated serves to control the final closing movement of the door, whereby it prevents cooperation between said first and second units until it has been operated to close the door.

27. A machine as claimed in claim 25 in which said releasable fastening device is a screw which engages cooperating means in the form of a threaded hole fixed relative to said fixed structure of the machine and which prevents the door knob from being moved from the OPEN position until it has been operated to lock the door closed.

* * * * *